Patented May 29, 1923.

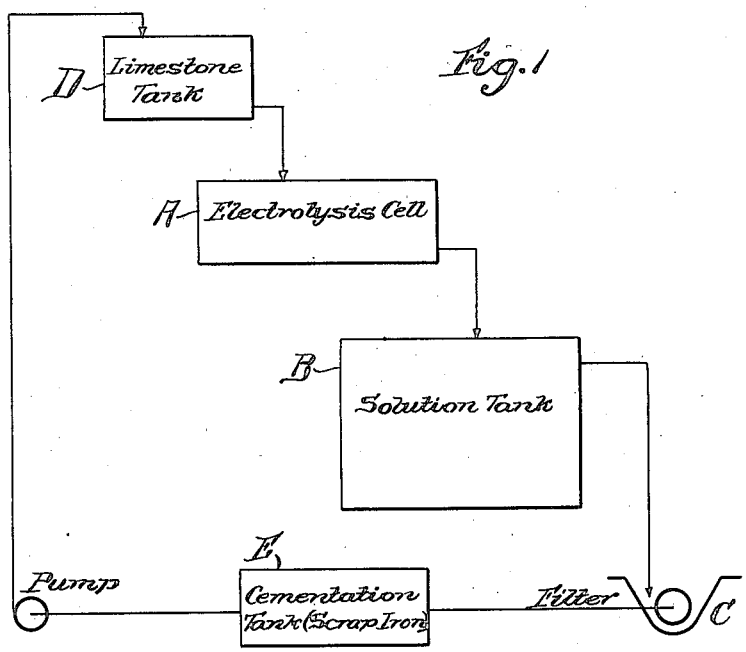
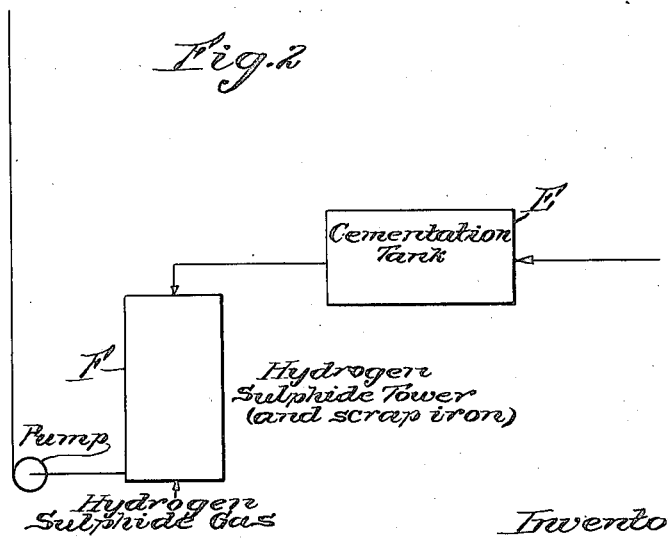

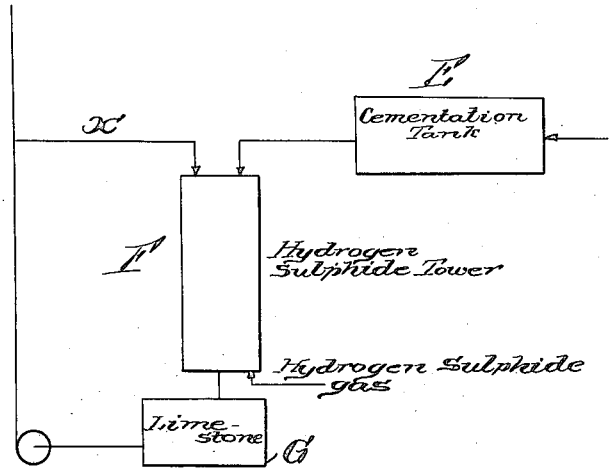
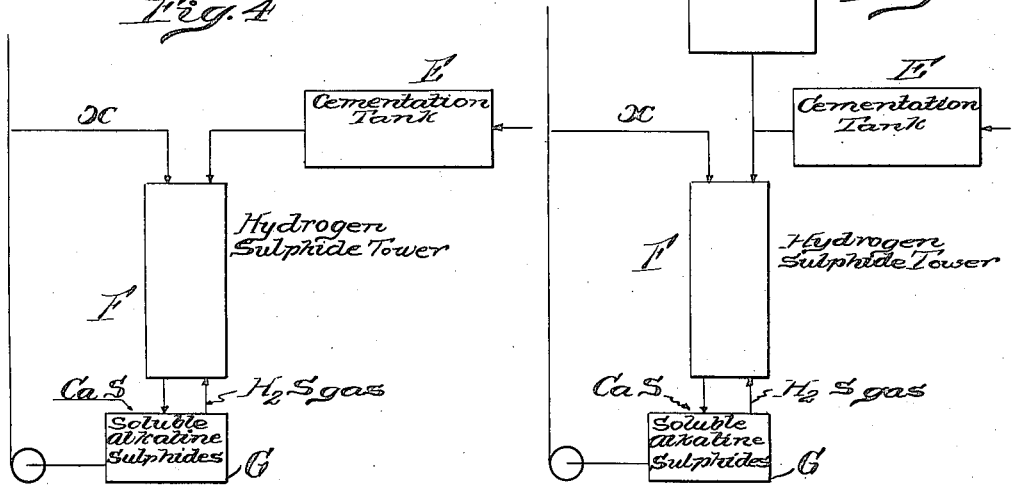

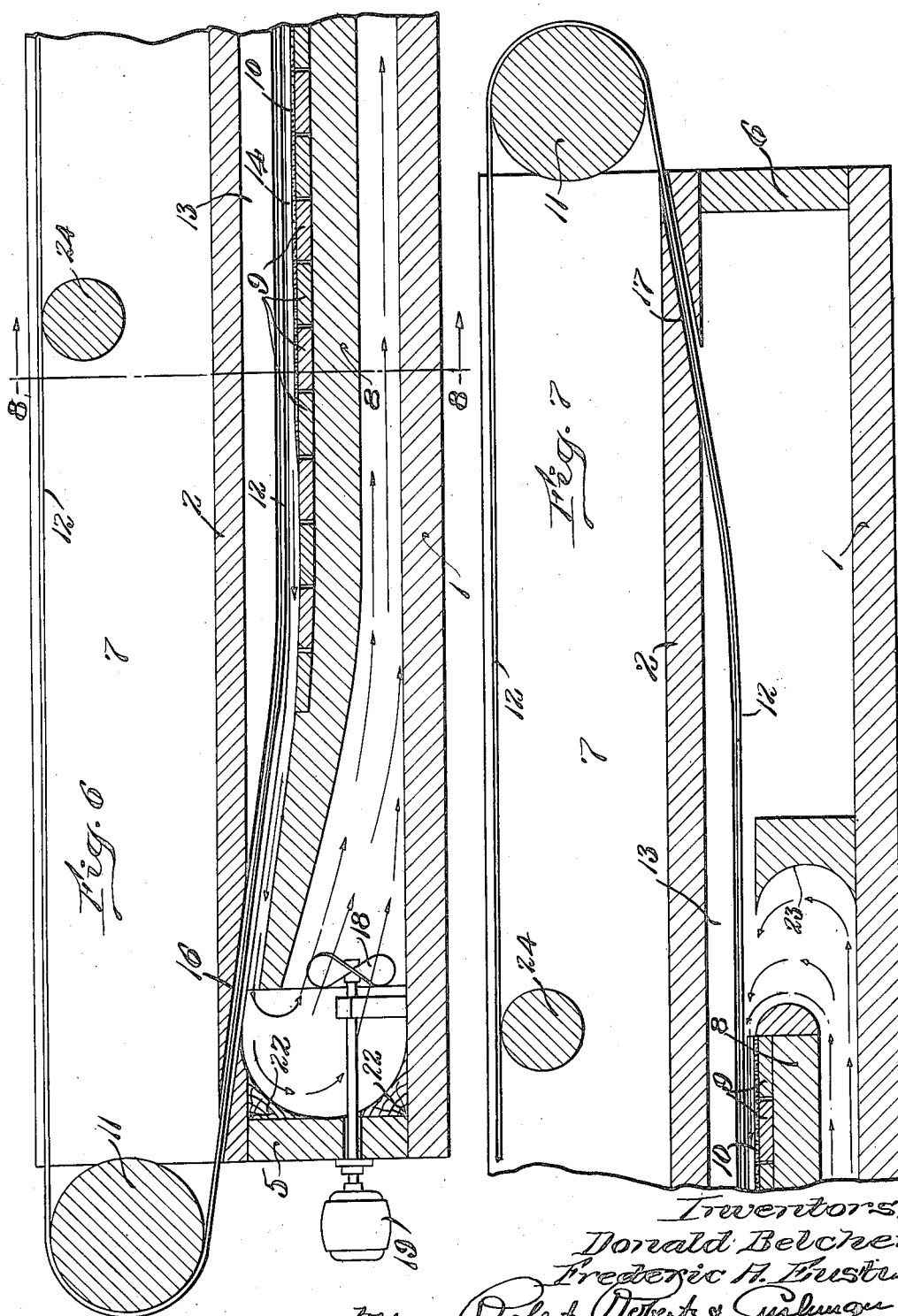

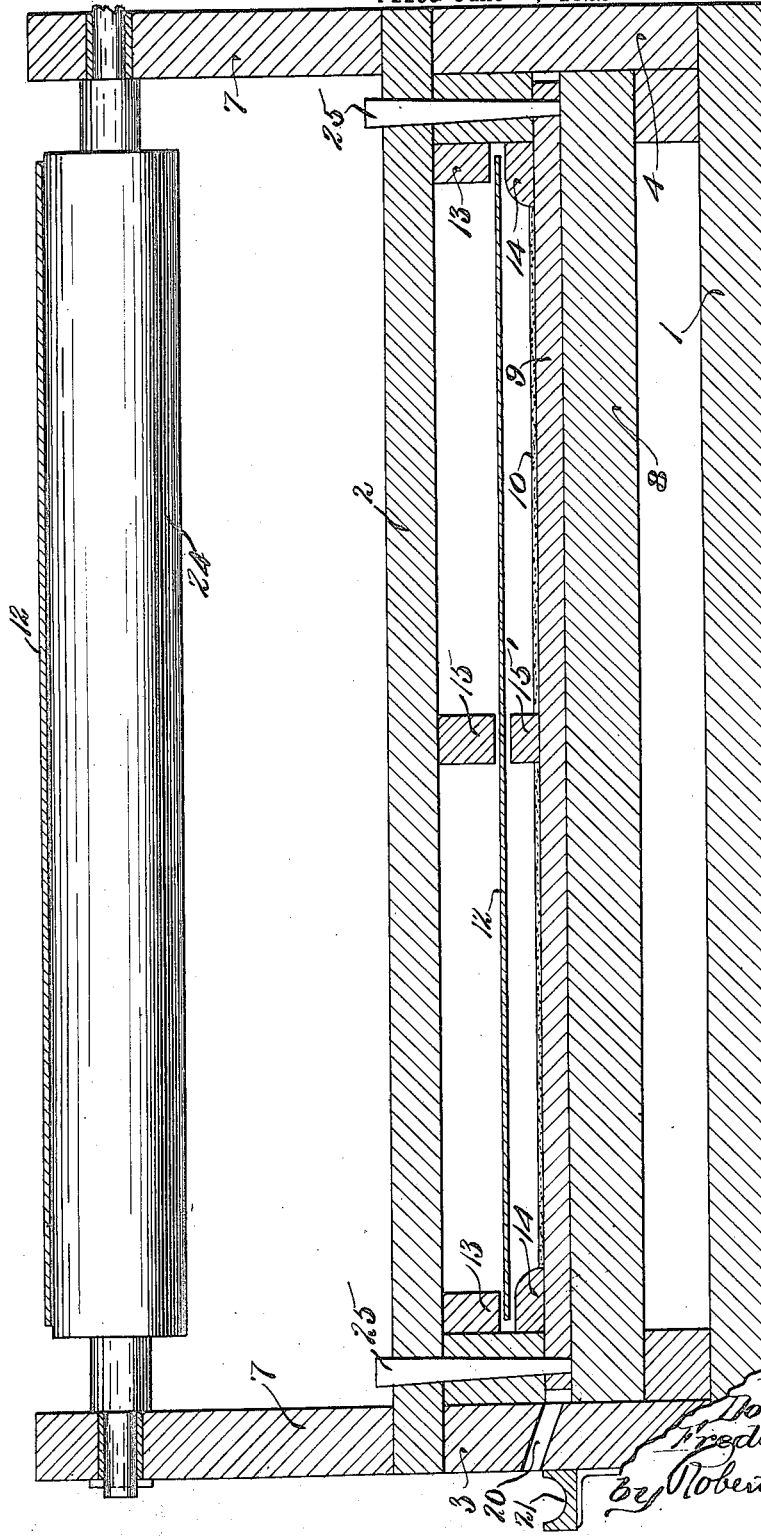

1,456,615

UNITED STATES PATENT OFFICE.

DONALD BELCHER, OF BOSTON, AND FREDERIC A. EUSTIS, OF MILTON, MASSACHUSETTS, ASSIGNORS OF ONE-HALF TO CHARLES PAGE PERIN, OF NEW YORK, N. Y., AND ONE-HALF TO SAID EUSTIS.

PURIFYING SOLUTIONS OF IRON AND RECOVERING METALS FROM SUCH SOLUTIONS.

Application filed June 7, 1922. Serial No. 566,581.

*To all whom it may concern:*

Be it known that we, DONALD BELCHER and FREDERIC A. EUSTIS, citizens of the United States of America, and residents, respectively, of Boston, in the county of Suffolk and State of Massachusetts, and Milton, in the county of Norfolk and State of Massachusetts, have invented new and useful Improvements in Purifying Solutions of Iron and Recovering Metals from Such Solutions, of which the following is a specification.

There are many ores which carry a large percentage of iron sulphide and relatively small quantities of copper, gold and silver, which often occur together, and there are other iron sulphides which carry as important minor metals nickel, cobalt and sometimes cadmium.

The processes for recovering the valuable metals other than iron which are associated with the iron sulphide, as heretofore practised, have usually been addressed exclusively to the recovery of such associated metals without recovering the iron and sulphur, which have been regarded as merely troublesome waste products to be got rid of. For example, it has been customary in treating copper, gold and silver ore which carries a large quantity of iron and sulphur to roast the ore to drive off the sulphur, and to slag the iron and throw it away; or, to recover the associated metals by the cyanide process which also eliminates the iron and sulphur, the latter usually being treated as waste products.

Many mines concentrate their ores and ship their concentrates to smelters or to cyanide mills or chlorination mills. They have to pay freight charges on a considerable tonnage of concentrate shipped including the iron and sulphur in order to recover the small quantities of gold and silver or other associated metals contained in the concentrates. At many mines electric power can be had cheaply and the present process makes it possible to produce iron and sulphur as well as to recover the other associated metals from these concentrates, or from the ores, at the mines without the waste of any of the valuable constituents, and without paying freight charges on great quantities of waste materials.

In Letters Patent of the United States, No. 1,412,174, granted to us and others April 11, 1922 for the art of making electrolytic iron, there is described among other things a process of producing iron by electrolysis from iron sulphides. We have discovered that by applying a similar process, with certain modifications hereinafter described, to iron sulphides containing other associated metals such as above referred to, we can recover not only the iron and sulphur but also the other associated metals. For example, when such iron sulphides are treated with solutions containing ferric chloride as described in said Patent No. 1,412,174, the copper is readily taken into solution with the iron, and the same is generally true of most of the other metals that may be present. Nickel and cobalt go into solution fairly readily. Silver and gold partly go into solution and partly remain in the residue. The associated metals are then recovered from the solution by selective precipitation, and the clear ferrous solution is electrolyzed for the manufacture of electrolytic iron.

Furthermore our process lends itself to the treatment of modest tonnage, whereas smelting operations require large tonnage and also the importation of fuel such as coke. In most cases the pure iron and sulphur recovered can be sold at a handsome profit leaving the associated metals in merchantable form that can be shipped at a minimum cost.

When copper is present the solutions coming from the solution tank will be passed over scrap iron and the copper will be precipitated thereby as cement copper. This cement copper may be shipped as it is, running probably 80% metallic copper, or it may be melted and partly refined in an electric furnace or otherwise, and be shipped as blister copper, running 98% or more copper. If gold and silver are present they will partly go into solution and partly remain in the residue. The part that goes into solution will be very largely precipitated with the copper and will be shipped to market in the blister copper or in the cement copper, in which form these metals are readily salable. The part that remains in the residue may be further concentrated by removing the sulphur which will leave a material consisting essentially of the silica and other insoluble material which will be relatively rich in gold and silver, and relatively small in volume so that it can be marketed to great advantage.

Nickel and cobalt will go into solution and may be cemented out as the copper is cemented out by a special treatment of the hot solution, or may be thrown out as described later in this application by the use of hydrogen sulphide or calcium sulphide.

Cadmium will be thrown out by the use of hydrogen sulphide or calcium sulphide as described later.

The process will now be described more in detail in connection with the accompanying drawings, in which:—

Fig. 1 is a diagram of apparatus for practising the process illustrating the cycle of operation;

Figs. 2 to 5 inclusive are fragmentary diagrams illustrating sundry modifications or alternative methods;

Fig. 6 is a longitudinal section through one end of the novel electrolysis cell hereinafter described;

Fig. 7 is a similar section through the other end of the cell; and

Fig. 8 is a cross section on an enlarged scale of the cell on line 8—8 of Fig. 6;

Referring first to the procedure illustrated by Fig. 1, the concentrate or ore, which is essentially iron sulphide containing some or all of the associated metals, copper, gold, silver, nickel, cobalt and cadmium, is fed in a finely divided state into the solution tank B where it will meet the anode liquor containing ferric chloride (or sulphate) delivered from the anode compartment of the electrolysis cell A.

If the iron sulphides are present in the form of pyrite (that is $FeS_2$) it will be desirable to heat them before they are fed into the solution tank B in order to remove one atom of sulphur, as described in Patent No. 1,412,174. In tank B the iron will be taken into solution by the ferric chloride, the ferric chloride will be reduced to the ferrous state and become ferrous chloride, and the sulphur will be precipitated. If there should be free acid in the solvent hydrogen sulphide gas would be evolved which complicates the process. Therefore we prefer to use a solvent without free acid. A suitable solvent would be, for example, a mixture of ferric chloride and ferrous chloride, containing 72 grams of iron per liter as ferric chloride and 72 grams of iron per liter of ferrous chloride, with or without other inert chlorides such as calcium chloride. A clear solution, such as above, may be prepared from pure salts without residue and without the addition of acid or other substance. The sulphur may be removed from the residue in any well known or preferred way, as by flotation or some other method of separation. Any copper in the concentrate or ore will also be taken into solution with the iron. Any gold and silver present will partly go into solution and partly remain with the residue of insoluble material. Nickel, cobalt and cadmium will also go into solution and may be dealt with as explained later.

The ferrous liquor containing ferrous iron and other associated metals in solution then passes to the filter C, where the insoluble materials including silica, the precipitated sulphur, and the gold and silver that have not been dissolved, will be collected as a filter cake, from which the sulphur, gold and silver may be recovered by known methods.

The clear solution of ferrous iron bearing also copper and some gold and silver is then delivered into the cementation tank E containing scrap iron, which precipitates the copper as cement copper, and also largely precipitates any gold and silver taken into solution. The nickel and cobalt, if present, may be cemented out by a special treatment, or may if desired be thrown out as later described by the use of hydrogen sulphide or calcium sulphide, as will any cadmium present. Only a minor fraction at most of the iron will be precipitated at this step with the other metals; the amount is so small as to be commercially negligible.

From the cementation tank E the clear solution of ferrous chloride is pumped through tank D containing limestone to the cathode compartment of electrolysis cell A. The limestone is a safe guard to neutralize any remaining traces of ferric chloride and to insure that the solution shall be neutralized and enter the electrolysis cell in a ferrous state. Any remaining ferric chloride in the solution will be precipitated by the limestone in the form of a hydrate. If the solution is already sufficiently neutral the limestone tank D may be omitted.

In case the precipitation of the associated metals in cementation tank E is not sufficiently complete the solution may be fed from tank E into a tower F (Fig. 2) into which hydrogen sulphide gas in introduced, which will precipitate out the last traces of gold and silver and also other associated metals or impurities as hereinafter described. From tower F the solution is passed through limestone tank D, if used, to electrolysis cell A and thence through the solution tank, as before, to complete the cycle.

Many sulphides of iron suitable for the process will, as commercially mined, contain other associated metals which may be deemed impurities, such as zinc, lead, arsenic, antimony, cadmium, etc. All of these impurities may be regarded either as valuable substances to be recovered, or simply as annoying impurities to be got rid of.

Zinc is one of the commonest of these impurities. It occurs often as a sulphide mixed with the sulphides of iron. It goes into solution readily when treated with ferric chloride. If it is not removed from the solution it tends to build up, as the solution is used over and over again, and when it has reached a sufficient concentration in the solution it begins to precipitate out with the iron on the cathode, forming an impure deposit. To make the very purest iron which in many cases commands a superior price, it is important to maintain the zinc in the electrolyte at a minimum. In some cases the zinc in the iron will do no harm for if the iron is melted, the zinc is entirely driven off, and the pure iron results, but if the iron is to be used without melting and it is desired to have an absolutely pure iron, zinc must be removed from the electrolyte. We have developed several operations for accomplishing this.

The removal of zinc depends in principle on the fact that zinc will precipitate as sulphide from slightly acid solutions whereas ferrous iron will not even precipitate (except in traces) from its neutral chloride or sulphate solutions.

Referring now to several methods by which the zinc may be removed,—Fig. 2 illustrates a tower F inserted in the circuit after the cementation tank E. The electrolyte may be passed from the cementation tank E down through tower F packed with insoluble material such as fragments of glass or earthenware, while hydrogen sulphide gas is introduced at the bottom of the tower. The following reaction then takes place: The zinc chloride reacts with the hydrogen sulphide, and forms zinc sulphide and hydrochloric acid according to this equation:

$$ZnCl_2 + H_2S = ZnS + 2HCl.$$

This reaction will continue until the hydrochloric acid has built up to a certain concentration which tends to partly retard the reaction. To prevent this retarding it is necessary to neutralize the hydrochloric acid as it is formed. This can be accomplished by keeping scrap iron in the circuit of the electrolyte, preferably in the tower F (Fig. 2). The acid will dissolve iron and thus be neutralized. The scrap iron might conceivably be in a separate tank between the tower F and the electrolysis cell but it is thought best to have it present during the gassing with hydrogen sulphide. The plant may be so arranged that this iron can be supplied from time to time as it is used up. The following reaction takes place:

$$Fe (scrap) + 2HCl = FeCl_2 + H_2.$$

An alternate way of neutralizing the acid is to use some limestone. This may be accomplished by the limestone tank D as shown in the diagram (Fig. 1). Any free acid which reaches the limestone would react with it and make calcium chloride and carbon dioxide which would escape. Or, the modification shown in Fig. 3 could be used, in which G is a tank containing limestone. The solution passes after gassing in tower F into the limestone tank G where the following reaction takes place:

$$CaCO_3 \text{ (or } CaO) + 2HCl = CaCl_2 + H_2O + CO_2$$

The major part of the solution is carried back into tower F through a pipe $x$ as indicated in Fig. 3, and only a small part is advanced to the electrolysis cell.

Another method of precipitating the zinc which is somewhat more vigorous in the action is to use calcium sulphide or sodium sulphide or other soluble alkaline sulphides, in solution in tank G. The procedure would then be as indicated in Fig. 4. Calcium sulphide put into tank G plus hydrochloric acid, which is generated by the hydrogen sulphide, forms more hydrogen sulphide. The hydrogen sulphide gas is then returned to the tower F. The reaction is as follows:

$$CaS + 2HCl = H_2S + CaCl_2$$

This not only neutralizes the acid but produces the gas necessary for further precipitating. Thus once this process is started it is not necessary to add any further quantities of hydrogen sulphide as the same is generated as it is needed. Here again the greater part of the solution is returned from tank G to tower F by pipe $x$, and only the lesser part is advanced for electrolysis.

Another and somewhat more delicate method of removing the zinc is indicated in Fig. 5. Calcium acetate is added to the solution from a tank H before it reaches tower F. The hydrogen sulphide in tower F, as we have seen, generates hydrochloric acid which reacts with the calcium acetate to form calcium chloride and acetic acid. The reaction is as follows:

$$2HCl + Ca(OAc)_2 = CaCl_2 + 2(HOAc).$$

The addition of a soluble acetate causes the removal of free acidity by the formation of undissociated acetic acid, which is such a mild acid that it does not prevent the precipitation of the zinc sulphide. Calcium sulphide or other soluble alkaline sulphides should be added to the solution in a tank G after gassing in the tower F. Part of the solution is returned by pipe $x$ to the tower F and part only advanced to the electrolytic cell, as before.

A still further modification of this zinc removal could be accomplished by using the hydrogen sulphide alone in tower F of apparatus such as is outlined in Fig. 2, but with pressure. This would necessitate a more complicated apparatus as the solution would have to be pumped into the tower F under pressure. The gas would act with greater vigor when condensed with pressure.

Any $H_2S$ remaining in the solution can if necessary be removed by blowing live steam or other inert gas into the solution, or by other known means.

The above described purification methods can be depended on to reduce the zinc in the electrolyte to the order of two tenths of one gram per liter or less. If it is desired to make the very purest iron, it may at times be desirable to reduce the zinc still further. We have found that this can be done by introducing into the solution a small amount of ferric hydroxide which actually would be accomplished in the cycle as described in Fig. 1 by the limestone tank D because the limestone precipitates a hydrate, namely ferric hydroxide. This ferric hydroxide has the faculty of absorbing many substances. Among these is zinc. It also absorbs some iron and therefore to some extent is wasteful, but it seems to offer the best method of reducing the zinc to the very lowest traces. The solution should be filtered before being fed to the electrolytic cell.

The methods which are described above will also remove the last traces of copper, lead, cobalt, nickel and cadmium, and of other associated metals whose sulphides are more readily precipitated than ferrous sulphide.

Thus our invention, in so far as it relates to the purification of the solution, contemplates broadly the precipitation of the associated metals or impurities by means of soluble sulphides such as calcium sulphide, sodium sulphide, etc., which have a selective action in that they precipitate the above associated metals and impurities harmful to electrolysis of the iron in preference to the ferrous iron even when the latter is present in great concentration and in great quantity. For removing the bulk of such impurities we prefer hydrogen sulphide, but for removing the last traces we prefer a soluble alkaline sulphide such as calcium sulphide.

It will be understood that the diagrams of Figs. 2 to 5 inclusive are mere fragmentary illustrations of the modifications to be connected up with the complete cycle such as that illustrated in Fig. 1.

After associated metals and impurities have been removed from the solution, the clear purified ferrous solution will be heated if it has cooled unduly, and subjected while hot to an electrolytic action in the electrolysis cell A in which iron will be deposited on the cathode, and the solution will be regenerated, a part of the ferrous chloride becoming ferric chloride, all as more fully explained in said Patent No. 1,412,174. The anode liquor containing ferric chloride will then be delivered to the solution tank B to be used over again and the cycle is complete.

Any suitable form of electrolysis tank, such as that described in said Patent No. 1,412,174 may be employed. Under certain conditions however, it may be desirable to remove the deposited iron from the cathode mechanically and continuously and with a minimum of labor. Accordingly a further feature of the invention consists in an improved mode of producing electrolytic iron or other metal by depositing it in brittle form from a solution on a trough and preferably flexible cathode, and then mechanically breaking up or cracking the brittle deposit, as by flexing or striking the cathode, to loosen and remove the deposit from the cathode. This method may well be performed in a novel electrolysis cell in which the iron is deposited on a flexible cathode consisting preferably of a flexible sheet of steel or iron or other suitable metal in the form of a continuous traveling belt or band which passes through the electrolysis cell. The iron deposited on this flexible, traveling belt cathode is brittle, and at the place where the belt bends over the pulley or drum outside of the electrolysis cell the brittle deposit will be broken up and may be conveniently collected on a belt conveyor or other suitable contrivance, and delivered continuously out of the plant. If desired a suitable scraper may be used at the bend of the belt cathode to facilitate the removal of the brittle deposit. Instead of a traveling belt the cathode may be in the form of a stationary flexible sheet which can be removed from the cell to allow the iron deposit to be knocked off with a hammer or other means to crack up the deposit so that it can be easily scraped off.

The preferred form of cell is illustrated in Figs. 6 to 8. It should be understood that Figs. 6 and 7 illustrate only the ends of the cell, and that the intervening structure, which is of considerable length, is a continuation of, and the same as that shown adjacent the broken ends of the figures.

The casing of the electrolysis cell is an elongate, shallow wooden structure comprising the bottom wall 1, the top wall 2, the side walls 3 and 4, and the end walls 5 and 6. At each side of the top wall 2, and running lengthwise of the casing, is an upwardly extending support 7, 7 for the rollers which carry and actuate the belt cathode.

A partition 8 of wood extends lengthwise of the casing and terminates short of the end walls thereof at each end. A series of anodes 9, slightly spaced apart and extending crosswise of the casing, are supported on the partition 8; and a sheet of asbestos cloth 10 covers the anodes and forms a diaphragm dividing the anode compartment below from the cathode compartment above.

The flexible cathode as herein shown consists of a continuous band or belt 12 of steel or iron, supported at its ends on rollers 11, 11, one or both of which may be driven to actuate the belt. The lower run of the belt cathode extends through the cathode compartment of the electrolytic cell above the diaphragm 10 and is guided at its side edges by suitable guide strips 13, 14 forming a guide channel between them. Centrally disposed, lengthwise extending strips 15, 15′, spaced apart as shown in Fig. 8, guide the belt at its middle line. Thus the proper electrode spacing is maintained between the belt cathode and the anodes. The upper run of the belt may be supported on idler rolls 24, mounted at intervals between the side supports 7, 7. Suitable inclined slots 16 and 17 are provided in the top wall 2 of the casing, for the passage of the lower run of the belt.

Circulation is maintained of the electrolyte in the cell as indicated by arrows by means of propellers 18, of which there may be several, driven by a motor 19 or other suitable means.

Deflectors 22 and 23 arranged at opposite ends of the partition serve to direct the stream of electrolyte around the ends of the partition.

A number of openings 20 (Fig. 8) through the side wall 3 enter the anode compartment, which is the space between the diaphragm 10 and the partition 8, and provide outlets for the anode liquor, discharging into a catch trough 21 on the outside of the casing. Graphite pencils 25 conduct current from a suitable source of electrical energy to the anodes 9.

It will be understood that the belt cathode 12 and the anodes 9 are suitably connected up to a source of electric current. Upon the passage of the current metallic iron is deposited in a sheet or layer or coating on the under surface of the belt cathode.

The deposited iron contains hydrogen and is brittle. As the traveling belt emerges from the cell it bends around one of the rollers 11 and will thereby crack or break up the brittle iron deposit so that it can easily be removed with the assistance of a scraper if necessary and collected in a receptacle, or on a belt conveyer, or in any other convenient manner for carrying it away.

Instead of a traveling belt the flexible cathodes may be used in the form of sheets of iron or steel supported vertically in the cell in the manner commonly used in zinc and copper electrolysis. Such flexible sheets would be removed from the cell when sufficient deposit had been made on them and the brittle deposit could be cracked off from them either by bending them or by striking them.

This type of cell is less economical to operate than that first described, but has the advantage that it occupies much less floor space per unit of depositing area and is cheaper to install.

Such modified form of cathode would sacrifice the advantage of continuous operation possessed by the belt cathode but would retain the advantage of flexibility which admits of breaking up the brittle iron deposit to facilitate its removal from the cathode.

The above described apparatus, and the continuous deposition and removal of the metal, is not herein claimed but forms the subject-matter of a separate application to be filed by said Frederic A. Eustis.

We claim:

1. The art of treating iron sulphide carrying also other associated metals, which comprises leaching the material with a suitable solvent to dissolve iron and part at least of the associated metals, removing from the solution the soluble metals other than iron by precipitating the same, together with at most a minor fraction of the iron, and then electrolyzing the solution to deposit iron therefrom.

2. The art of treating iron sulphide carrying also other associated metals, which comprises leaching the material with ferric chloride to dissolve iron and part at least of the associated metals, removing from the solution the soluble metals other than iron by precipitating the same, together with at most a minor fraction of the iron, and then electrolyzing the solution to deposit iron therefrom.

3. The art of treating iron sulphide carrying also other associated metals, which comprises leaching the material with a suitable solvent without free acid to dissolve iron and part of the associated metals leaving certain of the associated metals in the residue, removing from the solution the soluble metals other than iron by precipitating the same, together with at most a minor fraction of the iron, and then electrolyzing the solution to deposit iron therefrom and to regenerate the solvent.

4. The art of treating iron sulphide carrying also other associated metals, which comprises leaching the material with ferric chloride to dissolve iron and part of the associated metals leaving certain of the associated metals in the residue, removing from the solution the soluble metals other than iron by precipitating the same, together with at most a minor fraction of the iron, and then electrolyzing the solution to deposit iron therefrom and to produce again ferric chloride.

5. The art of treating iron sulphide carrying any of the associated metals, copper, gold and silver, which comprises leaching the material with a suitable solvent without free acid to dissolve the iron and the copper, if present, and part of the less easily soluble gold and silver, if present, leaving the rest of the gold and silver, and the sulphur, in the residue, and electrolyzing the solution to deposit iron therefrom and to regenerate the solvent.

6. The art of treating iron sulphide carrying any of the associated metals, copper, gold and silver, which comprises leaching the material with a suitable solvent to dissolve the iron and the copper, if present, and part of the less easily soluble gold and silver, if present, leaving the rest of the gold and silver, and the sulphur, in the residue, removing from the solution the soluble metals other than iron by precipitating the same, and electrolyzing the solution to deposit iron therefrom and to regenerate the solvent.

7. The art of treating iron sulphide carrying any of the associated metals, copper, gold and silver, which comprises leaching the material with ferric chloride to dissolve the iron and the copper, if present, and part of the less easily soluble gold and silver, if present, leaving the rest of the gold and silver, and the sulphur, in the residue, and electrolyzing the solution to deposite iron therefrom and to produce again ferric chloride.

8. The art of treating iron sulphide carrying copper, gold and silver and other associated metals, such as nickel and cobalt, which comprises leaching the material with a suitable solvent without free acid to dissolve the iron, the copper, the nickel and cobalt if present, and part of the less easily soluble gold and sliver, leaving the rest of the gold and silver and the sulphur in the residue, and electrolyzing the solution to deposit iron therefrom and to regenerate the solvent.

9. The art of treating iron sulphide carrying copper, gold and silver and other associated metals, such as nickel and cobalt, which comprises leaching the material with a suitable solvent to dissolve the iron, the copper, the nickel and cobalt if present, and part of the less easily soluble gold and silver, leaving the rest of the gold and silver and the sulphur in the residue, removing from the solution the soluble metals other than iron by precipitating the same, and electrolyzing the solution to deposit iron therefrom and to regenerate the solvent.

10. The art of treating iron sulphide carrying copper, gold and silver and other associated metals, such as nickel and cobalt, which comprises leaching the material with ferric-chloride to dissolve the iron, the copper, the nickel and cobalt if present, and part of the less easily soluble gold and silver, leaving the rest of the gold and silver and the sulphur in the residue, and electrolyzing the solution to deposit iron therefrom and to produce again ferric chloride.

11. The art of recovering iron and other associated metals from iron sulphide carrying some at least of the associated metals copper, gold, silver, nickel and cobalt, which comprises dissolving the iron and associated metals together in a suitable solvent, selectively precipitating the associated metals from the solution by means of metallic iron leaving all but a minor fraction at most of the dissolved iron in solution, and thereafter depositing iron from the solution by electrolysis.

12. The art of recovering iron and other associated metals from iron sulphide carrying some at least of the associated metals copper, gold, silver, nickel and cobalt and also metallic impurities of the kind described, which comprises dissolving the iron and part at least of the associated metals and the impurities together in a suitable solvent, selectively precipitating the associated metals from the solution leaving all but a minor fraction at most of the dissolved iron and impurities in solution, thereafter selectively precipitating the impurities from the solution leaving iron in solution, and thereafter depositing iron from the solution by electrolysis.

13. The art of making electrolytic iron from iron sulphide carrying also metallic impurities consisting of some at least of the metals zinc, lead, arsenic, antimony and cadmium, which comprises dissolving the iron and impurities together in a suitable solvent, selectively precipitating such impurities from the solution leaving iron in solution, and thereafter depositing iron from the solution by electrolysis.

14. The art of removing zinc and other metallic impurities, if present, from a solution containing much iron which comprises chemically reducing the solution, and then precipitating such impurities from the solution by treating the latter with a soluble sulphide.

15. The art of removing zinc and other metallic impurities, if present, from a solution containing much iron which comprises chemically reducing the solution, and then precipitating such impurities from the solution by treating the latter with hydrogen sulphide gas.

16. The art of removing zinc and other metallic impurities, if present, form a solution containing much iron, which comprises chemically reducing the solution, and then precipitating such impurities from the solution by treating the latter with hydrogen sulphide gas in the presence of metallic iron.

17. The art of removing zinc and other metallic impurities, if present, from a solution containing much iron, which comprises chemically reducing the solution, and then precipitating such impurities from the solution by treating the latter with a soluble sulphide in the presence of metallic iron.

18. The art of removing zinc and other metallic impurities, if present, from a solution containing much iron, which comprises chemically reducing the solution, and then precipitating such impurities from the solution by treating the latter with hydrogen sulphide gas and neutralizing the acid thereby formed.

19. The art of removing zinc and other metallic impurities, if present, from a solution containing much iron which comprises chemically reducing the solution, and then precipitating such impurities from the solution by treating the latter with hydrogen sulphide gas and then treating the solution with a soluble base such as lime to neutralize acid.

20. The art of removing zinc and other metallic impurities, if present, from a solution containing much iron, which comprises chemically reducing the solution, then precipitating such impurities from the solution by treating the latter with hydrogen sulphide gas, and then adding to the solution a soluble alkaline sulphide such as calcium sulphide.

21. The art of removing zinc and other metallic impurities, if present, from a solution containing much iron, which comprises chemically reducing the solution, then precipitating such impurities from the solution by treating the latter with hydrogen sulphide gas, and then adding to the solution a soluble alkaline sulphide such as calcium sulphide, thereby generating hydrogen sulphide gas, and returning the hydrogen sulphide gas so formed to the precipitation step.

22. The art of removing zinc and other metallic impurities, if present, from a solution containing much iron, which comprises chemically reducing the solution, then treating it with calcium acetate and hydrogen sulphide gas to precipitate said impurities, and then adding to the solution a soluble alkaline sulphide such as calcium sulphide.

23. The art of removing zinc and other metallic impurities, if present, from a solution containing much iron, which comprises chemically reducing the solution and then treating it with calcium acetate and hydrogen sulphide gas to precipitate said impurities.

24. The art of removing zinc and other metallic impurities, if present, from a solution containing much iron which comprises treating the solution with ferric hydrate to absorb said impurities, and thereafter filtering the solution.

25. The art of removing zinc and other metallic impurities, if present, from a solution containing much iron which comprises oxidizing a part of the iron in the solution and treating the solution with an alkaline base such as lime to precipitate ferric hydrate, utilizing the ferric hydrate to absorb said impurities, and thereafter filtering the solution.

26. The art of removing zinc and other metallic impurities, if present, from a solution containing much iron which comprises treating the solution with hydrogen sulphide gas to precipitate the greater part of said impurities, thereafter treating the solution with ferric hydrate to absorb the remaining impurities, and thereafter filtering the solution.

27. The art of removing zinc and other metallic impurities, if present, from a solution containing much iron which comprises treating the solution with hydrogen sulphide gas to precipitate the greater part of said impurities, then adding to the solution a soluble sulphide such as calcium sulphide, thereafter treating the solution with ferric hydrate to absorb the remaining impurities, and thereafter filtering the solution.

Signed by us at New York city, N. Y., this 31st day of May, 1922.

DONALD BELCHER.
FREDERIC A. EUSTIS.